Feb. 27, 1934.  W. C. HEATH  1,948,854
MAGNETO ELECTRIC MACHINE
Filed Aug. 29, 1932
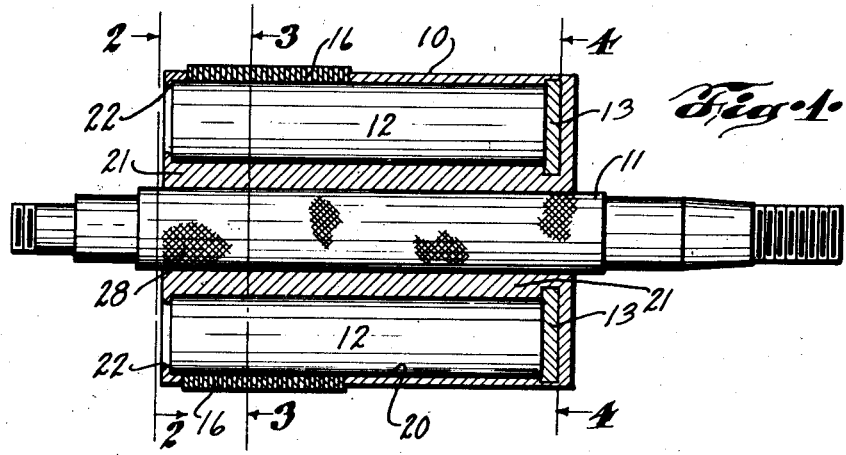
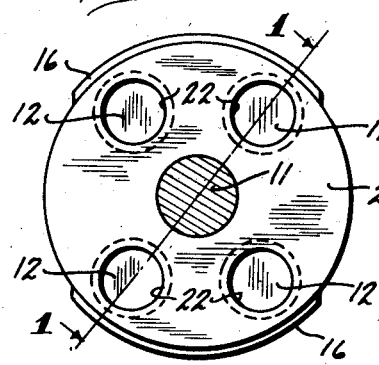
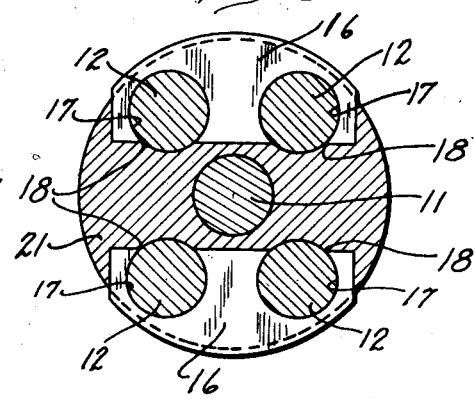
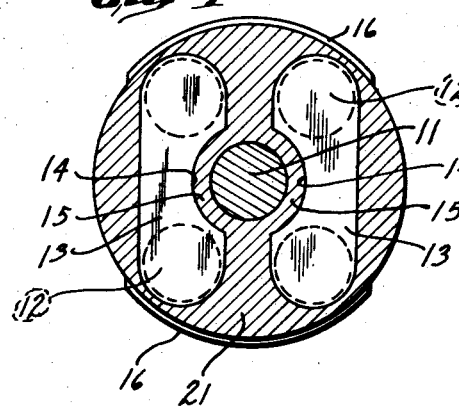
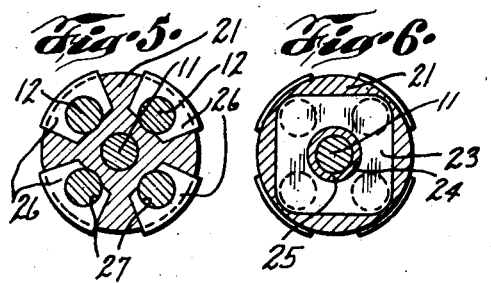
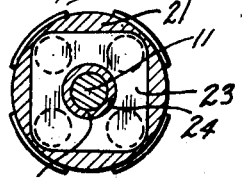
INVENTOR.
WILLIAM C. HEATH
BY
ATTORNEY.

Patented Feb. 27, 1934

1,948,854

UNITED STATES PATENT OFFICE 1,948,854

MAGNETO ELECTRIC MACHINE

William C. Heath, Milwaukee, Wis., assignor to Fairbanks, Morse & Co., Chicago, Ill., a corporation of Illinois Application August 29, 1932. Serial No. 630,874

4 Claims. (Cl. 171—252)

This invention relates to improvements in magneto electric machines, and more particularly to improvements in rotors of magnetos of the type employing rotating permanent magnets.

In certain prior types of magnet rotors, it is usual to employ a mass of cast non-magnetic metal, such as brass, for the rotor shaft and for intimately uniting the laminated pole shoes. Such structures are not desirable, in that a shaft of such metal is usually lacking in the requisite rigidity, and is needlessly expensive for shafting material. In magnetos of this type it is desirable to employ permanent magnets formed of cobalt steel or other material having high magnetic retentivity. Such materials have not been widely used in magnetos because of the difficulty experienced in machining the pole pieces and in securing them to the rotor. In prior types of rotor constructions it is not an uncommon practice to employ screws or other like fastening means for securing the permanent magnets and the various other parts to the rotor shaft. Such constructions are objectionable in that the screws tend to become loose and ineffective.

An object of the present invention is to provide an improved rotor for magnetos of the type above noted, which includes a rotor shaft formed of steel or other similar material, and a mass of die-cast aluminum or zinc alloy for securely assembling the laminated pole shoes to the shaft. By this provision, a shaft of substantial strength and rigidity is employed in the rotor assembly, and the resulting structure consists, in effect, of a single rigid unit.

A further object is to provide an improved construction of rotors of magnetos of the rotating field type which includes a mass of die-cast non-magnetic metal for securing the laminated pole shoes and a magnetic bridging member to the rotor shaft, and means for securing the pole pieces into intimate contact with the pole shoes and bridging member.

A still further object is to provide an improved rotor for magnetos of the rotating field type, in which the laminated pole shoes and the magnetic pole-bridging member are firmly assembled to the rotor shaft by means of a mass of die-cast non-magnetic metal, and in which the pole pieces are detachably assembled and more firmly secured to the die cast mass, than is possible through the use of screws, bolts, nuts or the like.

An additional object is to provide an improved rotor for magnetos of the rotating field type which is rigid and durable in construction, is composed of but a few simple and easily assembled parts, and which results in a substantial reduction of production costs, through minimization of machining operations on the permanent magnets.

Further objects and advantages will appear from the following detailed description of parts, and the accompanying drawing of a single preferred embodiment, and in which:

Fig. 1 is a longitudinal section of a preferred form of rotor for magnetos of the rotating field type, the section being taken along line 1—1 of Fig. 2; Fig. 2 is an end elevation, partially in section, as viewed from line 2—2 in Fig. 1; Fig. 3 is a section taken along line 3—3 in Fig. 1; Fig. 4 is a section taken along line 4—4 in Fig. 1; Fig. 5 is a section, substantially reduced in size, taken along line 3—3 in Fig. 1, and showing a modified pole shoe construction; and Fig. 6 is a reduced section taken along line 4—4 in Fig. 1 and showing a modified form of magnet bridging member to be employed in connection with the pole shoe construction shown in Fig. 5.

Referring by numerals to the drawing, the numeral 10 designates, generally, a preferred form of rotor for magnetos of the rotating field type, and which includes a rotor shaft 11 formed, by preference, of mild steel or other similar shafting material of substantial strength and rigidity. A plurality of pole pieces or permanent magnets 12 are, by preference, arranged in spaced relation, substantially parallel to each other, and to the shaft. These pole pieces are, by preference, formed of cobalt steel or other material possessing high magnetic retentivity, and are formed, by preferance, of circular section to facilitate any of the few necessary machining operations. In the preferred example shown, the rotor 10 includes four such pole pieces, although it will be understood that the number may be varied, depending upon the type and number of poles of the magneto to be constructed.

Referring more particularly to Figs. 3 and 4, wherein the parts of the rotor are arranged for a two pole machine, a pair of bridging members 13 of stamped soft iron or steel are disposed near one end of the rotor and each in contact with the end portions of a pair of the pole pieces 12 of opposed polarity. Each bridging member provides a flux path between the paired pole pieces of opposite polarity, to provide a structure which is, in effect, a U-shaped permanent magnet. By this arrangement there are provided two distinct magnetic circuits within the rotor, where a two pole machine is desired. Each bridging member 13 is provided with an intermediate semi-circular recessed portion 14. By reason of this construction, there results an annular space 15 which separates the shaft 11 from the opposed recessed inner margins of the members 13. Pole shoes 16 are provided, and consist of stacks of soft iron laminations, each of partly sector shape, which are arranged, respectively, on the free ends of the pole pieces 12, each pole shoe connecting the pole pieces of like polarity. Each lamination is, by preference, provided with a pair of apertures 17 which are slotted as indicated at 18, the pole pieces extending through these apertures. It will be readily seen that the pole shoes 16 only partially encircle the paired pole pieces, because of the slotted portion 18 of the laminations.

In assembling the rotor, the laminated pole shoes, bridging members 13 together with the rotor shaft, are suitably positioned in a die-casting mold. The mold, prior to casting, is provided with cores corresponding in size and shape with, and so as to result in openings 20. A mass of non-magnetic metal 21, such as a suitable aluminum or zinc alloy, is then poured into the mold for ultimately uniting to the shaft, the assembled laminations for the pole shoes, and the bridging members. After the casting process, the resulting rigid, integral structure is removed from the mold, the cores corresponding to the openings 20 removed from the casting and the pole pieces 12 are inserted through the pole shoe apertures 17 and the cored openings or sockets 20. It will, of course, be understood that the pole pieces 12 are formed slightly shorter in length than the length of the cored openings 20. Therefore, when an end of the pole piece is in contact with the bridging member 13, an annular portion 22 of the die cast mass 21 is available to be peened over the end of the pole pieces to serve to urge the opposite end of the pole piece into intimate contact with the soft iron bridging members 13 to insure good magnetic contact between the bridging members and pole pieces. By this peening operation the pole pieces are secured to the mass of cast metal, and the upset or deformed portions serve grippingly to engage and prevent any appreciable endwise or rotary movement of the pole pieces relative to the cast portions of the structure. The rotor is now completely assembled and ready for use in a magneto, and it will be apparent that by the above arrangement all screws or threaded fastening means for assembling the rotor, are eliminated, a much easier and more secure assembly being provided by the peened over portions.

It is, of course, understood that the projecting edge or lip 22, may be deformed into securing engagement with the end face of the pole piece, by applying pressure thereto in any suitable manner, as in a screw or hydraulic press.

In Figs. 5 and 6 certain of the rotor parts are shown as arranged for a four pole machine. In this modification, a plate 23 of stamped soft iron or steel is disposed near one end of each of the pole pieces 12, in place of the bridging members 13 employed in the above described two pole machine. The plate 23 provides a flux path common to all the pole pieces. A central circular aperture 24 is punched in the plate 23 which, when the plate is assembled in the rotor, causes the plate to be separated from the shaft 11 by an annular web 25 of the casting metal. Pole shoes 26 consisting of soft iron laminations, are arranged on the free ends of each pole piece, to form four separate and distinct poles. Each lamination is provided with a slotted aperture 27 similar to that shown in Fig. 3. It will be readily seen that the various parts are assembled in the same manner as described for the two pole machine.

In either construction above described, it will be seen that the mass of non-magnetic metal secures the various parts of the rotor to the shaft, and that a web of non-magnetic metal, magnetically insulates the bridging members 13 or the plate 23 from the shaft. The use of an upset portion of the cast metal for securing the pole pieces to the cast structure, eliminates expensive and difficult machining operations on the hard steel magnets. The only machining operation, viz., that of grinding the pole pieces to size and length, is simple and inexpensive, as compared to the machining necessary with prior types of rotors. It will be readily seen that all the parts of the rotor with the exception of the pole pieces 12 are metallically united into a rigid unitary structure, through the die-casting process.

The rotor shaft 11 is, by preference, provided with a knurled portion 28 to insure good interengaging coherence between the mass of cast metal 21 and the shaft. This knurled portion, resulting in an improved bond, prevents any relative movement between the body of cast metal 21 and the shaft. It will be apparent that the present improved rotor is neat and compact in construction, and forms practically a rigid, solid, rotating mass. It will, of course, be understood that my preference is not to die-cast the structure with the pole pieces in place, since the heat incident to the casting process, would anneal the pole pieces, resulting in an impairment of magnetic retentivity. It is therefore desirable to assemble the rotor as above described, and to assemble and secure the pole pieces in place by inwardly upsetting the annular neck of metal overlying the free ends of the pole pieces.

It will, of course, be understood that the present detailed description of parts and the accompanying drawing relate to only a single preferred executional embodiment of the invention, and that substantial changes may be made in the described arrangement and construction of parts without departing from the spirit and full intended scope of the invention.

I claim:

1. A magnet structure for magnetos of the rotating-field type, including a shaft, pole shoes, pole-piece-bridging elements, and a body of non-magnetic metal die-cast about said shaft and embracing the pole shoes and pole-piece-bridging elements, said body having preformed pole-piece openings of a length in excess of the length of the pole pieces to be received thereby, the cast metal in excess of the length of the pole pieces being deformed into engagement with the pole pieces whereby to secure the same in the openings therefor, and to maintain effectively, the magnetic engagement of the pole-pieces with the bridging elements.

2. A magnet structure for magnetos of the rotating-field type, including a shaft, a pole-piece bridging element, pole shoes, and a body of non-magnetic metal die-cast about an intermediate portion of said shaft and embracing the pole-piece-bridging element and pole shoes, the body being provided with preformed openings for receiving a plurality of pole pieces, said pole pieces being disposed in said openings, with the openings extending endwise beyond the pole pieces, the cast metal extending endwise beyond the pole pieces being deformed into engagement with corresponding ends of the pole pieces.

3. A magnet structure for magnetos of the rotating field type, including a die-cast body of non-magnetic metal provided with cast-in pole shoes, pole-piece bridging elements and a shaft of ferrous metal, the body being constructed with preformed pole piece sockets, the inner ends of which are terminated by said bridging elements, and the opposite ends of which extend outwardly beyond the pole pieces when inserted therein, the metal about said projecting outer ends being deformed into holding engagement with the pole pieces, and adapted thereby to keep the pole pieces in magnetic relation with said bridging elements.

4. The herein described method of assembling a plurality of pole pieces in a die-cast body of a magneto rotor structure of the rotating field type, which consists in die-casting a body of non-magnetic metal about a pole-piece bridging member, in preforming sockets in the die-cast metal body, of a length in excess of the pole pieces; in inserting said pole pieces in said sockets, so that portions of the cast body extend beyond the pole pieces, when in assembled relation; and in deforming the metal lying outwardly of the pole pieces and adjacent said sockets, whereby to secure the pole pieces in assembled relation in the cast body and to maintain the pole pieces in effective magnetic engagement with the bridging member.

WILLIAM C. HEATH.